United States Patent [19]

Yi

[11] Patent Number: 5,635,990
[45] Date of Patent: Jun. 3, 1997

[54] APPARATUS FOR CANCELLING NOISE AND IMPROVING DETAILS OF IMAGES

[75] Inventor: Gun-hee Yi, Suwon, Rep. of Korea

[73] Assignee: Samsung Electronics Co., Ltd., Kyungki-do, Rep. of Korea

[21] Appl. No.: 536,352

[22] Filed: Sep. 29, 1995

[30] Foreign Application Priority Data

Sep. 30, 1994 [KR] Rep. of Korea .................. 94-25046

[51] Int. Cl.$^6$ ........................................ H04N 5/213
[52] U.S. Cl. .............. 348/606; 348/607; 348/624
[58] Field of Search .......................... 348/606, 607, 348/624, 625, 630, 909; 358/167, 166, 36, 37; H04N 5/21, 5/213

[56] References Cited

U.S. PATENT DOCUMENTS 4,991,021  2/1991  Nikoh ............................... 348/606
5,400,151  3/1995  Okada ............................... 348/607

Primary Examiner—Sherrie Hsia
Attorney, Agent, or Firm—Sughrue, Mion, Zinn, Macpeak & Seas

[57] ABSTRACT

An apparatus for cancelling noise and improving details of color components of an image by processing a color component value corresponding to a respective pixel, including a high-frequency component detector for individually detecting a high-frequency color component value contained in the color component value corresponding to the respective pixel, a noise detector for receiving the high-frequency color component value detected by the high-frequency component detector, judging whether a noise component is contained in a corresponding pixel and outputting a first binary signal indicative of a judgement result, a storage unit for outputting a value designated by the detected high-frequency color component value and the first binary signal among detail improved values and noise cancelled values both of which are pre-stored therein, and an adder for individually adding the value output from the storage unit and the corresponding color component value. Accordingly, detail improvement and noise cancelling is accomplished for each pixel, thereby enhancing resolution of an image displayed on a screen.

15 Claims, 4 Drawing Sheets

EXTRACTED SIGNAL

APPARATUS FOR CANCELLING NOISE AND IMPROVING DETAILS OF IMAGES

BACKGROUND OF THE INVENTION

The present invention relates to an apparatus for cancelling noise and improving details of an image signal.

FIG. 1 shows a conventional noise canceller and FIGS. 2A through 2D show waveform diagrams for explaining an operation of the FIG. 1 apparatus.

As shown in FIG. 2A, noise contained in an image signal is mostly formed of high-frequency components. An image signal including such noise is applied to a high-pass filter 1 and an adder 3. High-pass filter 1 filters the input image signal shown in FIG. 2A and extracts only high-frequency components as shown in FIG. 2B. A limiter 2 outputs a signal having an amplitude equal to or less than a predetermined value among the high-frequency components supplied from high-pass filter 1 and then supplies the signal to adder 3. Here, the predetermined value is determined based on a fact that a noise signal usually has a small amplitude. Thus, the signal output from limiter 2 becomes a noise signal contained in the high-frequency components, which is shown in FIG. 2C. Adder 3 adds the FIG. 2A signal and a signal inverting the output of limiter 2, to generate an image signal shown in FIG. 2D. However, as can be seen from an image signal shown in FIG. 2D which is changed from the FIG. 2A waveform so that edges of the image signal are rounded, the FIG. 1 apparatus removes even detail components such as an edge as well as the noise contained in the high-frequency components of the image signal. The image signal from which the noise is cancelled by such a conventional noise canceller lowers resolution of the image signal to be displayed.

SUMMARY OF THE INVENTION

Therefore, to solve the above problem, it is an object of the present invention to provide an apparatus for improving details of an image as well as cancelling noise contained in the image based on a judgement result with respect to whether or not the noise is contained in the image.

To accomplish the above object of the present invention, there is provided an apparatus for cancelling noise and improving details of color components of an image by processing a color component value corresponding to a respective pixel, the noise cancelling and detail improvement apparatus comprising:

high-frequency component detection means for individually detecting a high-frequency color component value contained in the color component value corresponding to the respective pixel; noise detection means for receiving the high-frequency color component value detected by the high-frequency component detection means, judging whether a noise component is contained in a corresponding pixel and outputting a first binary signal indicative of a judgement result; storage means for outputting a value designated by the detected high-frequency color component value and the first binary signal among detail improved values and noise cancelled values both of which are pre-stored therein; and adder means for individually adding the value output from the storage means and the corresponding color component value.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings FIGS. 3 through 5B.

Figure 1:
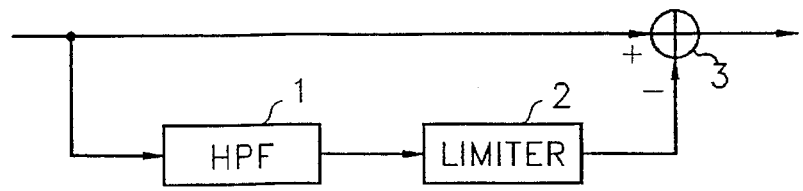
FIG. 1 is a block diagram of a conventional noise canceller.
Figure 2A:
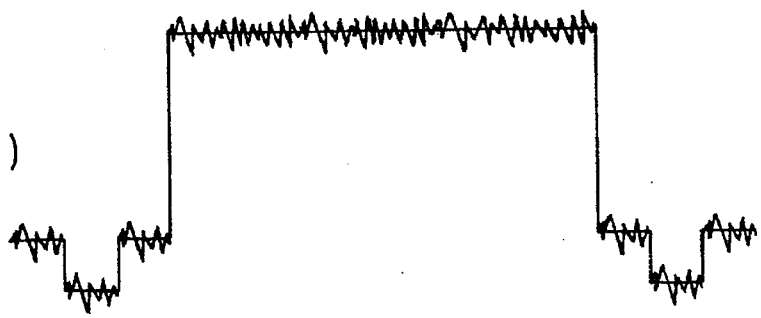
FIGS. 2A through 2D are waveform diagrams of signals in the respective portions of FIG. 1.
Figure 2B:
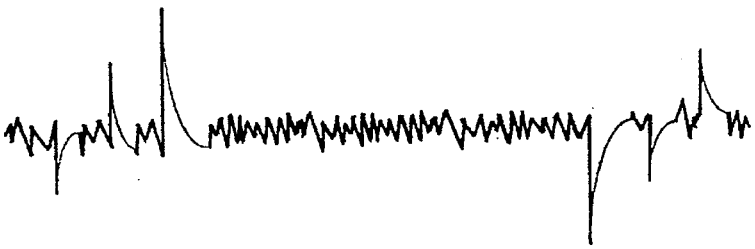
Figure 2C:
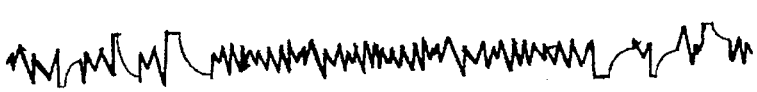
Figure 2D:
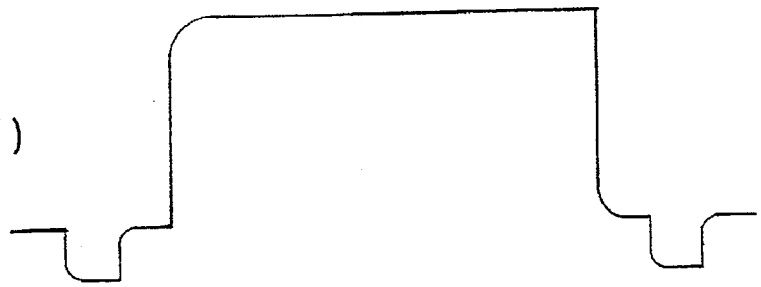
Figure 3:
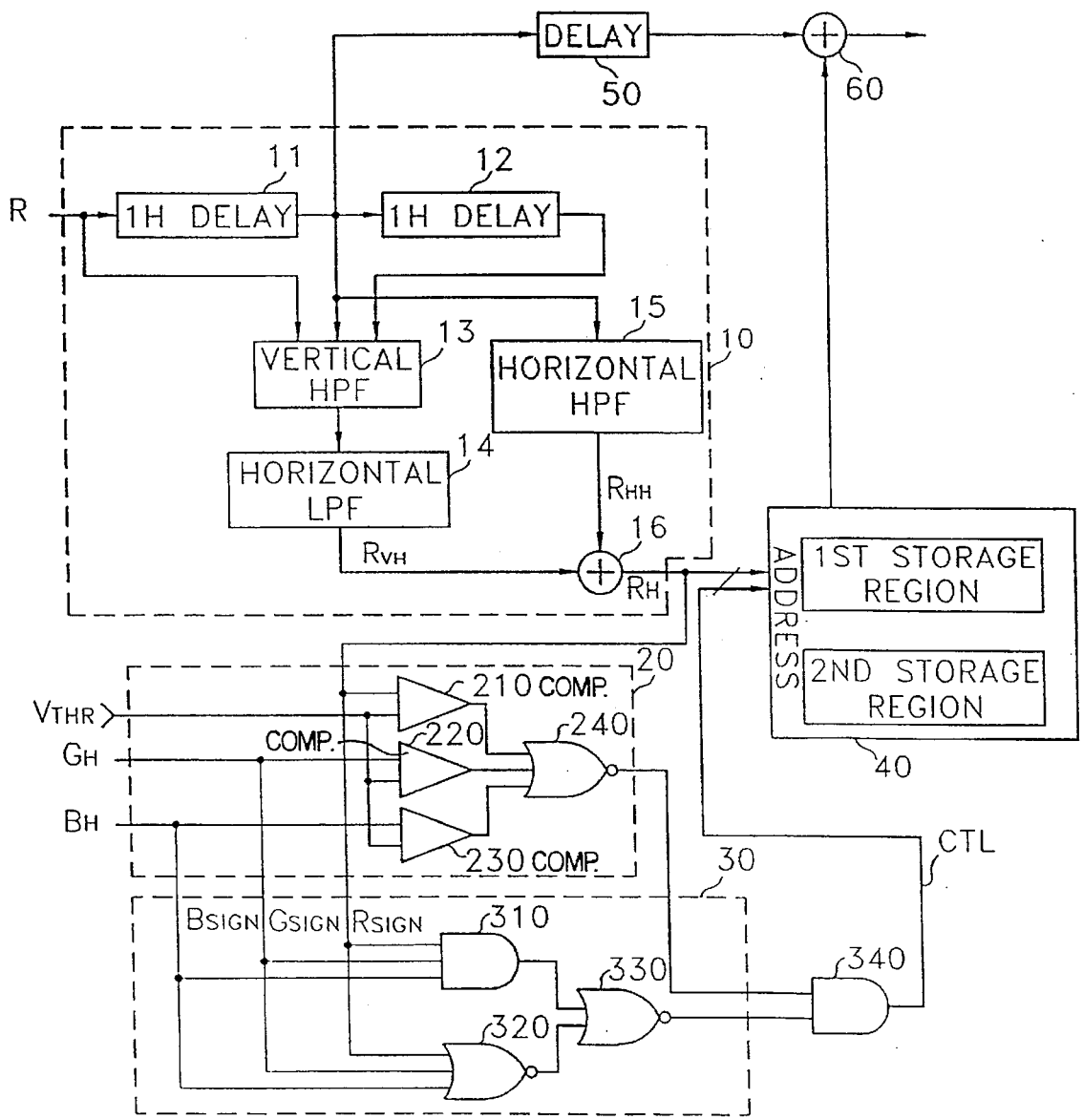
FIG. 3 is a block diagram showing a noise cancelling and detail improvement apparatus according to a preferred embodiment of the present invention.

FIG. 3 shows an apparatus for cancelling noise and improving details of an image according to a preferred embodiment of the present invention.

The FIG. 3 apparatus performs a process for noise cancelling, detail improvement with respect to respective red, green and blue component values constituting respective pixels. A high-frequency component extractor 10 shown in FIG. 3 receives a red component value R and generates a high-frequency red component value $R_H$. First and second delays 11 and 12 in high-frequency component extractor 10 delay the applied red component value R by a horizontal scanning period (1 H) and output the delayed result. The signal input of first delay 11 and the outputs of delays 11 and 12 are connected to the inputs of a vertical high-pass filter 13. The output of vertical high-pass filter 13 is connected to the input of a horizontal low-pass filter 14. The output of first delay 11 is also connected to the input of horizontal high-pass filter 15. A first adder 16 adds the outputs of horizontal low-pass filter 14 and horizontal high-pass filter 15 to produce a high-frequency red component value $R_H$. High-frequency red component value $R_H$ produced by first adder 16 is used as an address for reading out a detail improved value or a noise cancelled value stored in a storage unit 40. The output of first delay 11 is delayed by a third delay 50. The high-frequency component extractor 10, third delay 50 and a second adder 60 shown in FIG. 3 have the same construction and relationship as those when processing red component value R, green component value G and blue component value B, respectively. By this reason, only high-frequency component extractor 10, third delay 50 and second adder 60 for processing red component value R are shown in FIG. 3. The output of first adder 16 is input to a magnitude comparator 20 and a correlation detector 30, respectively.

Magnitude comparator 20 includes comparators 210, 220 and 230 for receiving a high-frequency red component value $R_H$, a high-frequency green component value $G_H$ and a high-frequency blue component value $B_H$ and comparing the received values with a predetermined threshold value $V_{THR}$ and a first NOR gate 240 for negatively logically summing the outputs of comparators 210, 220 and 230. The circuits for producing high-frequency green component value $G_H$ and high-frequency blue component value $B_H$ which are input to magnitude comparator 20 are not shown in FIG. 3. However, high-frequency green component value $G_H$ and high-frequency blue component value $B_H$ are generated by blocks for green component value G and blue component value B having the same functions as that of high-frequency component extractor 10 for red component value R. Correlation detector 30 comprises a first AND gate 310 for logically multiplying sign bit values $R_{SIGN}$, $G_{SIGN}$ and $B_{SIGN}$ of the respective high-frequency color component values, a second NOR gate for negatively summing sign bit values $R_{SIGN}$, $G_{SIGN}$ and $B_{SIGN}$, and a third NOR gate 330 for negatively summing the outputs of first AND gate 310 and second NOR gate 320. A second AND gate 340 logically multiplies the output of magnitude comparator 20 by the output of correlation detector 30, and supplies the multiplied result to a storage unit 40. Storage unit 40 stores detail improved values and noise cancelled values corresponding to the respective high-frequency color component values therein, and determines one of the detail improved values and noise cancelled values corresponding to the respective high-frequency color component values $R_H$, $G_H$ and $B_H$ according to the output of second AND gate 340. The outputs of third delay 50 and storage unit 40 are added in a second adder 60.

An operation of the FIG. 3 apparatus having the above constitution will be described below with reference to the accompanying drawings FIGS. 4A through 5B.

Figure 4A:
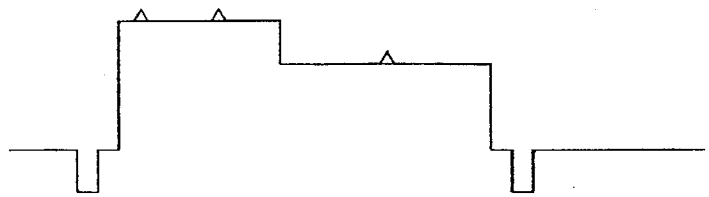
FIGS. 4A through 4C are waveform diagrams showing high-frequency components contained in color components, respectively.
Figure 4B:
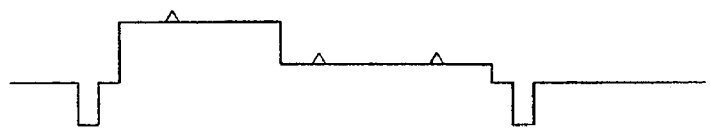
Figure 4C:
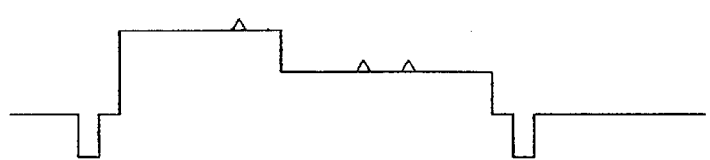
Figure 4D:
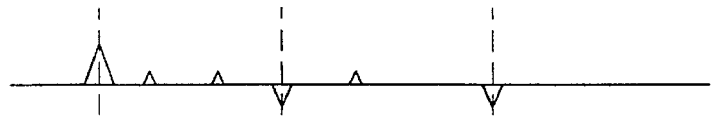
FIGS. 4D through 4F are waveform diagrams showing high-frequency color components high-pass-filtering color components, respectively.
Figure 4E:
Figure 4F:
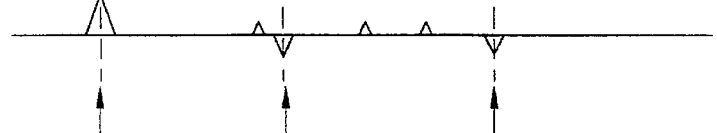

The red, green and blue component values R, G and B which are input to the FIG. 3 apparatus have the respective high-frequency color component values as shown in FIGS. 4A through 4C. Since signal processing of the color component values is performed in the same manner, only high-frequency component extractor 10 for receiving red component value R and producing high-frequency red component value $R_H$ will be described below. First delay 11 delays red component value R by a horizontal scanning period, and supplies the delayed red component value R to vertical high-pass filter 13, second delay 12 and third delay 50. Vertical high-pass filter 13 uses the red component values delayed by first and second delays 11 and 12 and the red component value which is input to first delay 11, to vertically high-pass-filter the red component value output from first delay 11. The vertical high-pass filter 13 outputs a value having the vertical high-frequency component and the noise component. The output of vertical high-pass filter 13 is processed so that details of diagonal high-frequency component are not excessively improved by horizontal low-pass filter 14. Meanwhile, horizontal high-pass filter 15 horizontally high-pass-filters the output of first delay 11. Horizontal high-pass filter 15 outputs a value $R_{HH}$ having the horizontal high-frequency component and the noise component. First adder 16 adds the output $R_{VH}$ of horizontal low-pass filter 14 and the output $R_{HH}$ of horizontal high-pass filter 15, and outputs high-frequency red component value $R_H$ according to the addition result to storage unit 40. High-frequency red component value $R_H$, and both high-frequency green component value $G_H$ and high-frequency blue component value $B_H$ which are produced in the same manner as that of high-frequency red component value $R_H$, are shown in FIGS. 4D through 4F, respectively. The high-frequency color component values $R_H$, $G_H$ and $B_H$ are applied to magnitude comparator 20.

Magnitude comparator 20 and correlation detector 30 receive high-frequency color component values $R_H$, $G_H$ and $B_H$ and judge whether or not a corresponding pixel contains noise components. Magnitude comparator 20 judges whether or not a pixel corresponding to the input high-frequency color component values $R_H$, $G_H$ and $B_H$ contains noise components based on the magnitudes of the input high-frequency color component values $R_H$, $G_H$ and $B_H$. Correlation detector 30 judges whether or not there is a correlation between high-frequency color component values $R_H$, $G_H$ and $B_H$ corresponding to one pixel based on sign bit values $R_{SIGN}$, $G_{SIGN}$ and $B_{SIGN}$ possessed by high-frequency color component values $R_H$, $G_H$ and $B_H$. In more detail, comparators 210, 220 and 230 in magnitude comparator 20 compare the respective input high-frequency color component value $R_H$, $G_H$ or $B_H$ with a predetermined threshold value $V_{THR}$. Based on the comparison result, first comparator 210 outputs a binary value "1" when high-frequency red component value $R_H$ is larger than threshold value $V_{THR}$. Second comparator 220 outputs a binary value "1" when high-frequency green component value $G_H$ is larger than threshold value $V_{THR}$. Third comparator 230 outputs a binary value "1" when high-frequency green component value $B_H$ is larger than threshold value $V_{THR}$. First NOR gate 240 negatively and logically sums the outputs of comparators 210, 220 and 230 and outputs the result to second AND gate 340. Thus, when any one of high-frequency color component values $R_H$, $G_H$ and $B_H$ is larger than threshold value $V_{THR}$, first NOR gate 240 outputs a binary value "0" indicating that the corresponding pixel contains no noise components. Meanwhile, sign bit values $R_{SIGN}$, $G_{SIGN}$ and $B_{SIGN}$ of high-frequency color component values $R_H$, $G_H$ and $B_H$ which are input to magnitude comparator 20, are input to correlation detector 30. First AND gate 310 logically multiplies three sign bit values $R_{SIGN}$, $G_{SIGN}$ and $B_{SIGN}$ and outputs the resultant binary value to third NOR gate 330. Second NOR gate 320 negatively and logically sums sign bit values $R_{SIGN}$, $G_{SIGN}$ and $B_{SIGN}$ and outputs the resultant value to third NOR gate 330. The first AND gate 310 and second and third NOR gates 320 and 330 judge whether high-frequency color component values $R_H$, $G_H$ and $B_H$ have the same sign. When the output of first AND gate 310 or second NOR gate 320 is a value "1," a judgement is given that there exists correlation between the high-frequency color component values corresponding to one pixel, that is, noise components are not contained. As a result, third NOR gate 330 outputs a binary value "0" when there exists correlation between the high-frequency color component values corresponding to one pixel.

Second AND gate 340 logically multiplies the output of first NOR gate 240 by the output of third NOR gate 330. The output of second AND gate 340 becomes a binary value "0" independently of the output of second NOR gate 330, when a judgement is given that there is no noise components in the corresponding pixel, that is, the output of magnitude comparator 20 is a value "0." Also, when the output of magnitude comparator 20 is a value "0," that is, all of high-frequency color values $R_H$, $G_H$ and $B_H$ are smaller than threshold value $V_{THR}$, the output of second AND gate 340 becomes the output of second NOR gate 330. In more detail, if a judgement is not given whether the corresponding pixel contains the noise components based on the magnitude of high-frequency color component values $R_H$, $G_H$ and $B_H$, the output of second AND gate 340 becomes a value "0" when sign bit values $R_{SIGN}$, $G_{SIGN}$ and $B_{SIGN}$ of the high-frequency color component values have the same sign. The output of second AND gate 340 is used as a control signal CTL necessary for outputting data in storage unit 40.

Figure 5A:
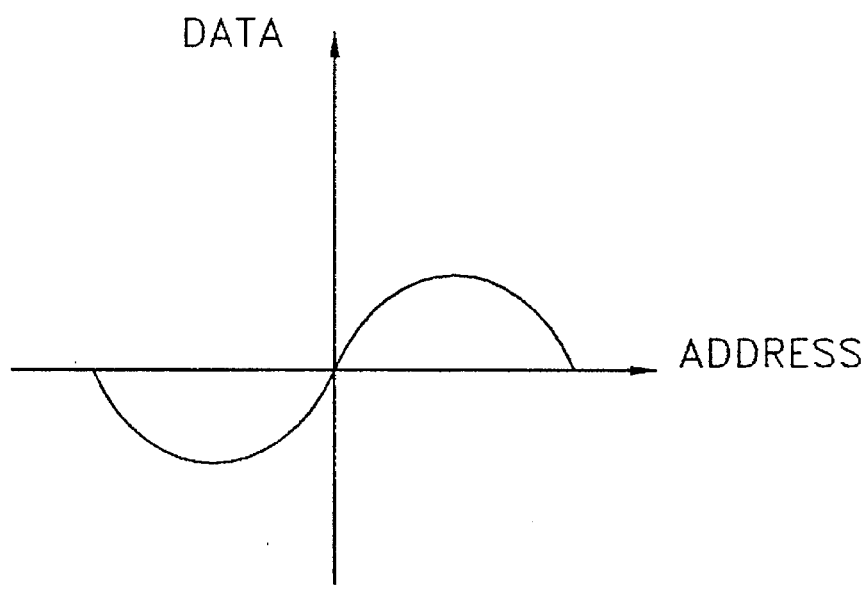
FIG. 5A is a waveform diagram showing an input and output characteristic for detail improvement.
Figure 5B:
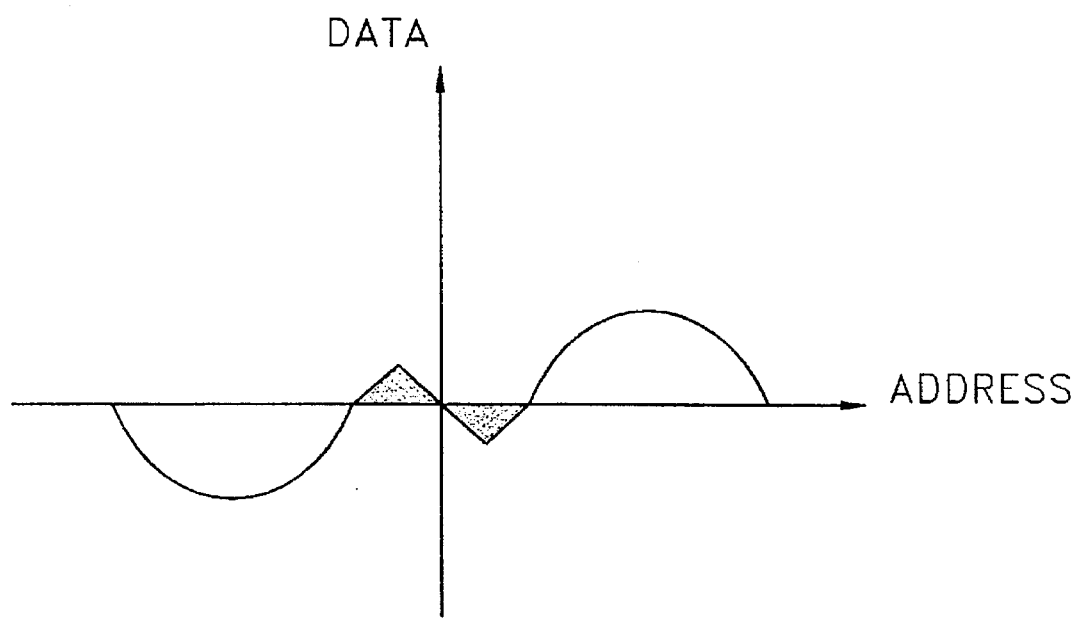
FIG. 5B is a waveform diagram showing an input and output characteristic for noise cancelling.

Storage unit 40 stores the input and output characteristics shown in FIGS. 5A and 5B for each color component. The input and output characteristic of FIG. 5A shows an improvement of the details with respect to a color component having no noise. The input and output characteristic of FIG. 5B shows noise cancelling with respect to a color component having noise. In FIG. 5B, the noise components contained in an original signal are effectively removed by a characteristic of trigonal patterns near the origin. The storage unit 40 stores the input and output characteristics in a single memory having different addresses as a look-up table. In other words, the input and output characteristics of FIG. 5A are stored in a first storage region having addresses each of which the value of the most significant bit is "0" and the input and output characteristics of FIG. 5B are stored in a second storage region having addresses each of which the value of the most significant bit is "1." Thus, storage unit 40 outputs a detail improved value selected among detail improved values stored in the first storage region according to a corresponding high-frequency color component value when a value of control signal CTL output from second AND gate 340 is "0." Storage unit 40 outputs a noise cancelled value selected among noise cancelled values stored in the second storage region according to a corresponding high-frequency color component value when a value of control signal CTL output from second AND gate 340 is "1." It is apparent that storage unit 40 can be designed in a pattern of individually designated memories according to a value of control signal CTL.

The detail improved value or the noise cancelled value output from storage unit 40 according to each high-frequency color component value $R_H$, $G_H$ or $B_H$, and control signal CTL are applied to second adder 60. Second adder 60 also receives a corresponding red component value delayed by third delay 50. Third delay 50 delays the output of first delay 11 so that the color component value used for determination of the detail improved value or the noise cancelled value output from storage unit 40 can be accurately added in second adder 60. As a result, the output of second adder 60 becomes the color component value from which the detail is improved or the noise is cancelled according to presence or absence of noise in the color components of the corresponding pixel.

The above-described apparatus according to one embodiment of the present invention uses both magnitude comparison and correlation detection. However, it is possible to design another embodiment in which only a predetermined threshold value $V_{THR}$ is compared with high-frequency color component values $R_H$, $G_H$ and $B_H$, to thereby judge whether a noise component is contained in one pixel.

As described above, the noise cancelling and detail improvement apparatus according to the present invention judges whether the noise components exist based on the magnitude of the color components for each pixel and/or the correlation between the color components, and performs the detail improvement and the noise cancelling based on the judgement result, to thereby bring about an effect of enhancing resolution of the image.

While only certain embodiments of the invention have been specifically described herein, it will be apparent that numerous modifications may be made thereto without departing from the spirit and scope of the invention.

What is claimed is:

1. An apparatus for cancelling noise and improving details of color components of an image by processing a color component value corresponding to a respective pixel, said noise cancelling and detail improvement apparatus comprising:

high-frequency component detection means for individually detecting high-frequency color component values contained in the color component value corresponding to the respective pixel;

noise detection means for receiving the high-frequency color component values detected by said high-frequency component detection means, judging whether a noise component is contained in a corresponding pixel and outputting a first binary signal indicative of a judgement result;

storage means for outputting a value designated by the detected high-frequency color component values and the first binary signal among detail improved values and noise cancelled values both of which are pre-stored therein; and adder means for individually adding the value output from said storage means and the corresponding color component value.

2. The noise cancelling and detail improvement apparatus according to claim 1, wherein said detected high frequency color component values are a red component value, a green component value and a blue component value, respectively.

3. The noise cancelling and detail improvement apparatus according to claim 2, wherein said high-frequency component detection means comprises a first detector for detecting a high-frequency color component value with respect to the red component value; a second detector for detecting a high-frequency color component value with respect to the green component value; and a third detector for detecting a high-frequency color component value with respect to the blue component value.

4. The noise cancelling and detail improvement apparatus according to claim 3, wherein each of said first, second and third detectors comprises a first delay for delaying a corresponding color component by a horizontal scanning period and outputting result of said delaying; a second delay for delaying the output of said first delay by the horizontal scanning period; a first filter for receiving a signal containing the corresponding color component applied to said first delay and signals of the outputs of said first and second delays and vertically high-pass-filtering the received signals; a second filter for horizontally low-pass-filtering the output of said first filter; a third filter for receiving and horizontally high-pass-filtering the output of said first delay; and a first adder for adding the outputs of said second and third filters and outputting the high-frequency color component value according to an addition result.

5. The noise cancelling and detail improvement apparatus according to claim 1, wherein said noise detection means individually compares a predetermined threshold value with the detected high-frequency color component values, and outputs the first binary signal based on a result of comparing the predetermined threshold value with detected high-frequency color component values.

6. The noise cancelling and detail improvement apparatus according to claim 5, wherein said noise detection means outputs the first binary signal indicating that the corresponding pixel has no noise component when at least one of the high-frequency color component values is larger than said predetermined threshold value.

7. The noise cancelling and detail improvement apparatus according to claim 5, wherein said noise detection means outputs the first binary signal based on a correlation between the high-frequency color component values when all of the high-frequency color component values are smaller than the predetermined threshold value.

8. The noise cancelling and detail improvement apparatus according to claim 7, wherein said noise detection means judges whether the correlation exists based on the signs of the high-frequency color component values.

9. The noise cancelling and detail improvement apparatus according to claim 8, wherein said noise detection means outputs the first binary signal representing that there is no noise component in the corresponding pixel if the high-frequency color component values corresponding to one pixel have the same sign.

10. The noise cancelling and detail improvement apparatus according to claim 1, wherein said noise detection means comprises:

magnitude comparator means for comparing the detected high-frequency color component values respectively with the predetermined threshold value and outputting a second binary signal representing whether at least one of the high-frequency color component values has a value larger than the predetermined threshold value based on a result of said comparing;

correlation detector means for detecting whether there is correlation between the detected high-frequency color component values and outputting a third binary signal indicative of a result of said detecting whether there is correlation between the detected high-frequency color component values; and binary signal generator means for outputting the first binary signal having a binary value representing that there is no noise component in the corresponding pixel when said second binary signal has a binary value representing that at least one of the high-frequency color component values has a binary value larger than the predetermined threshold value, and for outputting the first binary signal of which a value is determined based on said third binary signal when said second binary signal has a binary value representing that all of the high-frequency color component values have binary values smaller than the predetermined threshold value.

11. The noise cancelling and detail improvement apparatus according to claim 10, wherein said magnitude comparator means comprises:

comparators for comparing the detected high-frequency color component values respectively with the predetermined threshold value and outputting binary values indicative of the result of said comparing; and a first NOR gate for negatively and logically summing the binary values outputted from said comparators and outputting the second binary signal indicative of a result of said negatively and logically summing.

12. The noise cancelling and detail improvement apparatus according to claim 11, wherein said correlation detector means comprises:

a first AND gate for logically multiplying sign values of the detected high-frequency color component values;

a second NOR gate for negatively and logically summing the sign values of the detected high-frequency color component values; and a third NOR gate for negatively and logically summing the outputs of said first AND gate and said second NOR gate.

13. The noise cancelling and detail improvement apparatus according to claim 12, wherein said binary signal generator means comprises a second AND gate for logically multiplying the output of said first NOR gate by the output of said third NOR gate, and outputting the first binary signal indicative of a result of the logically multiplying.

14. The noise cancelling and detail improvement apparatus according to claim 1, wherein said storage means stores the detail improved values and the noise cancelled values corresponding to addresses composed of the respective detected high-frequency color component values and a value of the first binary signal, outputs the detail improved values having addresses composed of a binary value and the respective detected high-frequency color component values when the first binary signal has the binary value representing that there is no noise component in the corresponding pixel, and outputs the noise cancelled values having addresses composed of a binary value and the respective detected high-frequency color component values when the first binary signal has the binary value representing that there is a noise component in the corresponding pixel.

15. The noise cancelling and detail improvement apparatus according to claim 1, wherein said adder means comprises a delay for delaying the color component value corresponding to each pixel, and an adder for adding the output of said storage means and the corresponding color component value output from said delay.

* * * * *